US008888650B2

(12) United States Patent
Mori et al.

(10) Patent No.: US 8,888,650 B2
(45) Date of Patent: *Nov. 18, 2014

(54) VEHICLE DRIVE APPARATUS

(75) Inventors: Atsushi Mori, Anjo (JP); Ryohei Kubo, Anjo (JP); Hiroki Shintani, Anjo (JP); Koji Takasu, Anjo (JP); Haruhisa Suzuki, Miyoshi (JP); Masabumi Nishigaya, Nagoya (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 151 days.

This patent is subject to a terminal disclaimer.

(21) Appl. No.: 13/522,580

(22) PCT Filed: Mar. 22, 2011

(86) PCT No.: PCT/JP2011/056699
§ 371 (c)(1),
(2), (4) Date: Jul. 17, 2012

(87) PCT Pub. No.: WO2011/122385
PCT Pub. Date: Oct. 6, 2011

(65) Prior Publication Data
US 2013/0008274 A1      Jan. 10, 2013

(30) Foreign Application Priority Data
Mar. 31, 2010   (JP) ................................. 2010-081557

(51) Int. Cl.
*F16H 57/08*       (2006.01)
*B60K 6/48*        (2007.10)
(Continued)

(52) U.S. Cl.
CPC  *B60K 6/48* (2013.01); *H02K 7/083* (2013.01); *F16H 57/0482* (2013.01);
(Continued)

(58) Field of Classification Search
CPC ......... F16H 1/28; F16H 57/021; F16H 57/08; F16H 57/082

USPC ................... 475/149, 150, 331, 346
See application file for complete search history.

(56) References Cited

U.S. PATENT DOCUMENTS 5,099,704 A    3/1992  Williams et al.
5,156,579 A   10/1992  Wakuta et al.
(Continued)

FOREIGN PATENT DOCUMENTS

JP    S59-152240 U    10/1984
JP    A-4-185262       7/1992
(Continued)

OTHER PUBLICATIONS

International Search Report issued in International Patent Application No. PCT/JP2011/056699 dated May 10, 2011.
(Continued)

*Primary Examiner* — Edwin A Young
(74) *Attorney, Agent, or Firm* — Oliff PLC (57) ABSTRACT

A vehicle drive apparatus includes a motor generator, a speed reduction mechanism connected to a rotor shaft of the motor generator, an output shaft connected to the speed reduction mechanism, an intermediate wall separating the motor generator from the speed reduction mechanism, and a bearing that is fixed to the intermediate wall and supports the rotor shaft. The motor generator, intermediate wall, speed reduction mechanism, and output shaft are disposed in this order, and a ring gear of the speed reduction mechanism is fixed. The ring gear is fixed to the intermediate wall via a ring gear flange that is positioned relative and fixed to the intermediate wall by a centering mechanism and a locking mechanism. The centering mechanism is formed by fitting a boss of the ring gear flange and the intermediate wall. The locking mechanism is disposed on an outer peripheral side relative to the centering mechanism.

20 Claims, 7 Drawing Sheets

(51) Int. Cl.
*H02K 7/08* (2006.01)
*H02K 7/116* (2006.01)
*F16H 57/00* (2012.01)
*F16H 57/04* (2010.01)
*F16H 1/22* (2006.01)

(52) U.S. Cl.
CPC ............ *H02K 7/116* (2013.01); *Y02T 10/6221* (2013.01); *F16H 57/0006* (2013.01); *F16H 1/227* (2013.01); *F16H 57/0476* (2013.01); *F16H 57/0479* (2013.01); *F16H 57/08* (2013.01)
USPC .......................................................... 475/331

(56) References Cited

U.S. PATENT DOCUMENTS

| | | | |
|---|---|---|---|
| 5,813,938 | A | 9/1998 | Forster |
| 7,195,575 | B2 * | 3/2007 | Kempf ................ 475/5 |
| 8,550,956 | B2 * | 10/2013 | Kubo et al. .......... 475/331 |
| 2007/0265133 | A1 | 11/2007 | Smook |
| 2009/0206709 | A1 * | 8/2009 | Kakuda et al. ............. 310/68 D |
| 2013/0008274 | A1 | 1/2013 | Mori et al. |
| 2013/0072345 | A1 | 3/2013 | Kubo et al. |

FOREIGN PATENT DOCUMENTS

| | | |
|---|---|---|
| JP | A-7-298547 | 11/1995 |
| JP | A-8-61438 | 3/1996 |
| JP | A-2000-52788 | 2/2000 |
| JP | A-2000-120812 | 4/2000 |
| JP | A-2001-343053 | 12/2001 |
| JP | A-2003-191761 | 7/2003 |
| JP | A-2004-116736 | 4/2004 |
| JP | A-2005-132365 | 5/2005 |
| JP | A-2008-126710 | 6/2008 |
| JP | A-2009-79625 | 4/2009 |
| JP | A-2009-168142 | 7/2009 |
| JP | A-2009-209965 | 9/2009 |
| JP | A-2009-291053 | 12/2009 |

OTHER PUBLICATIONS

Office Action issued in U.S. Appl. No. 13/622,184 dated Apr. 19, 2013.

English translation of Office Action issued in Japanese Patent Application No. 2012-508219 dated Mar. 26, 2013.

* cited by examiner

VEHICLE DRIVE APPARATUS

INCORPORATION BY REFERENCE

The disclosure of Japanese Patent Application No. 2010-081557 filed on Mar. 31, 2010 including the specification, drawings and abstract is incorporated herein by reference in its entirety.

BACKGROUND OF THE INVENTION

The present invention relates to a vehicle drive apparatus that outputs rotation of a motor generator from an output shaft by reducing a speed of the rotation through a speed reduction mechanism, and more specifically, to a vehicle drive apparatus including a ring gear fixed in a speed reduction mechanism.

DESCRIPTION OF THE RELATED ART

A known vehicle including a motor generator as a drive source (for example, a hybrid vehicle and an electric vehicle) includes a speed reduction mechanism that transmits rotation of the motor generator to an output shaft by reducing the speed of the rotation. The speed reduction mechanism includes a sun gear, a carrier, and a ring gear. Of these components, either the carrier or the ring gear needs to be fixed. Specifications requirements, for example, determine which should be fixed.

As an example of the case in which the carrier is fixed, the carrier is fixed to a wall on which a rotor shaft of the motor generator is fixed (see Japanese Patent Application Publication No. JP-A-2004-116736). When the carrier is fixed, however, an oil passage extending from an intermediate wall to a pinion gear via the carrier needs to be formed in order to supply the pinion gear that rotates with lubricating oil. This complicates an oil passage configuration. Further, when the carrier is fixed, there is a restriction on a reduction ratio, so that a desired reduction ratio may not be achieved.

A case may therefore arise in which, for example, the ring gear needs be fixed depending on a required reduction ratio. A known example of fixing the ring gear includes a case in which an outer periphery of the ring gear is fixed to a case. In this case, the pinion gear rotates while revolving around the sun gear, which eliminates the need for forming an oil passage through which the lubricating oil is supplied to the pinion gear. When the ring gear is fixed, however, vibration occurring from meshing gears or that occurring as a result of deformation of the ring gear due to a compelling force (a force acting from the pinion gear on the ring gear when the speed reduction mechanism is in action) is directly transmitted to an outer peripheral portion of the case. This poses a problem of large gear noise emitted from the case. Therefore, in order to reduce the gear noise from the case, for example, a ring gear is fixed to a case via an intermediate member (shock-absorbing member) disposed on an outer periphery of the ring gear (Japanese Patent Application Publication No. JP-A-2009-168142).

SUMMARY OF THE INVENTION

However, when the ring gear is fixed to the case on the outer periphery of the ring gear, this fixing disables alignment through meshing between the ring gear and the pinion gear. To achieve good axis accuracy (for centering of the ring gear), therefore, it becomes necessary to machine splines to close tolerances in an axial direction on an inner surface of the case and the outer periphery of the ring gear. Machining the inner surface of the case is, however, difficult (it is technically possible, but becomes highly expensive). Specifically, when the ring gear is fixed, if the ring gear is fixed to the case on the outer periphery of the ring gear, achieving good axis accuracy of the ring gear is practically difficult. If an intermediate member is interposed between the ring gear and the case, as in Japanese Patent Application Publication No. JP-A-2009-168142, the axis accuracy of the ring gear is even more aggravated.

The aggravated axis accuracy of the ring gear could result in poor tooth contact between the ring gear and the pinion gear. The poor tooth contact results in reduced gear durability and aggravated gear noise. Specifically, in the art disclosed in Japanese Patent Application Publication No. JP-A-2009-168142, if good axis accuracy of the ring gear is achieved, the gear noise emitted from the case can be reduced. If the axis accuracy of the ring gear is not achieved, however, the gear noise emitted from the case cannot be reduced. Japanese Patent Application Publication No. JP-A-2009-168142 does not, however, mention centering of the ring gear, and therefore, it is highly likely that the gear noise emitted from the case will not be reduced with the art disclosed in Japanese Patent Application Publication No. JP-A-2009-168142.

In order to solve the problems described above, it is an object of the present invention to provide a vehicle drive apparatus that includes a speed reduction mechanism in which a ring gear is fixed to thereby allow the ring gear to be reliably centered and gear noise emitted from a case to be reliably reduced.

In order to solve the problems described above, a vehicle drive apparatus according to a first aspect of the present invention includes a motor generator; a speed reduction mechanism connected to a rotor shaft of the motor generator; an output shaft connected to the speed reduction mechanism; an intermediate wall separating the motor generator from the speed reduction mechanism; and a bearing that is fixed to the intermediate wall and supports the rotor shaft. In the vehicle drive apparatus, the motor generator, the intermediate wall, the speed reduction mechanism, and the output shaft are disposed in this order, and a ring gear of the speed reduction mechanism is fixed. In the vehicle drive apparatus, the ring gear is fixed to the intermediate wall via a ring gear flange that is positioned relative to, and fixed to, the intermediate wall by a centering mechanism and a locking mechanism, the centering mechanism is formed by fitting of a boss portion of the ring gear flange and the intermediate wall, and the locking mechanism is disposed on an outer peripheral side relative to the centering mechanism.

In this vehicle drive apparatus according to the first aspect, a speed of rotation of the motor generator is reduced by the speed reduction mechanism, and the rotation at a reduced speed is output from the output shaft. In this vehicle drive apparatus, the ring gear of the speed reduction mechanism is fixed. Specifically, the ring gear is fixed to the intermediate wall via the ring gear flange that is positioned relative to, and fixed to, the intermediate wall by the centering mechanism and the locking mechanism. In other words, the ring gear is fixed relative to the case by fixing the ring gear flange to the intermediate wall that forms part of the case, instead of fixing the outer periphery of the ring gear to the case. This eliminates any physical contact between the outer periphery of the ring gear and the case, so that vibration occurring from meshing gears or that occurring as a result of deformation of the ring gear due to a compelling force is less likely to be transmitted to an outer periphery of the case. Vibration of the ring gear caused by other factors is transmitted to the outer periphery of the case through the intermediate wall. These allow the gear noise emitted from the case to be reliably reduced.

The ring gear can be centered by the centering mechanism formed by fitting of the boss portion of the ring gear flange and the intermediate wall. Additionally, the ring gear is fixed via the ring gear flange, so that alignment can be achieved through meshing between the ring gear and the pinion gear. From the foregoing, the ring gear can be centered accurately.

In addition, the locking mechanism is disposed on an outer periphery side relative to the centering mechanism. This allows the locking mechanism to be disposed on a relatively outer peripheral side of the ring gear flange. Load acting on the locking mechanism can thereby be made small, so that the ring gear can be solidly fixed in place. Together with the accurate centering of the ring gear, the foregoing improves tooth contact between the ring gear and the pinion gear. Gear noise can thereby be made small without reducing gear durability. Gear noise emitted from the case can therefore be reduced even further.

In the vehicle drive apparatus according to a second aspect of the present invention, the locking mechanism may include a protruding portion disposed on the intermediate wall or the ring gear flange and an insertion hole formed in the ring gear flange or the intermediate wall, into which the protruding portion is inserted. Note that the protruding portion may be integrally formed with, or separately formed from, the intermediate wall or the ring gear flange.

The locking mechanism can thus be achieved with such a simple structure of the protruding portion disposed in the intermediate wall and the insertion hole formed in the ring gear flange, or the protruding portion disposed in the ring gear flange and the insertion hole formed in the intermediate wall.

In the vehicle drive apparatus according to a third aspect of the present invention, the protruding portion may be a pin fixed in the intermediate wall, and the insertion hole may have a small diameter portion having a diameter smaller than a portion in which the pin is inserted, or a bottom portion.

In the vehicle drive apparatus according to the third aspect, the pin is fixed in the intermediate wall and the ring gear flange has the insertion hole. This makes it possible to simultaneously machine a fitting hole formed in the intermediate wall for fixing the pin and a fitting surface (hole) on the intermediate wall side into which the boss portion of the ring gear flange is to be fitted when the case is machined. This improves machining (positioning) accuracy of both, thus improving supporting accuracy (centering accuracy) of the ring gear, which is advantageous to reduction of the gear noise.

When the case is to be formed, a main housing formed with the intermediate wall and an extension housing (to be disposed rearwardly in the case) need to be positioned, and typically, a dowel pin is driven into the housing side. The main housing therefore has a dowel hole into which the dowel pin is driven. Fixing the pin in the intermediate wall as described above allows the pin fixing hole and the dowel hole to be machined simultaneously. This ensures accurate positioning between the main housing and the extension housing relative to each other, so that the entire speed reduction mechanism including the ring gear can be accurately positioned. This is because the ring gear is centered with the intermediate wall of the main housing and the bearing that supports the output shaft connected to a carrier that forms part of the speed reduction mechanism is fixed to the extension housing. Achieving good positioning accuracy for the speed reduction mechanism as a whole as described above ensures proper tooth contact between the pinion gear and the ring gear, which advantageously affects gear durability and gear noise reduction. Further, high productivity can be achieved by simultaneously machining the insertion hole and the dowel hole and simultaneously driving the pin or other protrusion and the dowel pin into the respective holes.

In the vehicle drive apparatus according to the third aspect, the insertion hole in which the pin is inserted has the small diameter portion having a diameter smaller than a portion in which the pin is inserted, or the bottom portion. Specifically, the insertion hole is a stepped hole or a closed-bottom hole. This eliminates likelihood that the pin fitted in the intermediate wall will come off the insertion hole even if the pin comes off the intermediate wall. The ring gear can therefore be reliably locked (fixed).

In the vehicle drive apparatus according to a fourth aspect of the present invention, the protruding portion may be a pin fixed in the intermediate wall, and the pin may be press-fitted in a press-fitting hole in the intermediate wall and have a flange portion that is disposed on an end portion of the pin closer to the motor generator and has a diameter larger than the press-fitting hole.

Accordingly, the pin does not come off the intermediate wall of the case onto the speed reduction mechanism side on which the pin is more likely to come off. Reliability against removal of the pin from the intermediate wall can therefore be enhanced even further.

In the vehicle drive apparatus according to the fourth aspect, the pin is fixed in the intermediate wall and the ring gear flange has the insertion hole. As described earlier, therefore, good supporting accuracy (centering accuracy) of the ring gear is achieved, which is advantageous to reduction of the gear noise. Additionally, as described earlier, accurate positioning between the main housing and the extension housing can be achieved, which ensures good positioning accuracy of the entire speed reduction mechanism including the ring gear. This advantageously affects gear durability and gear noise reduction and yields high productivity.

In the vehicle drive apparatus according to a fifth aspect of the present invention, the pin may include a press-fitting portion to be press-fitted in the press-fitting hole and an end portion disposed closer to the speed reduction mechanism than the press-fitting portion, and the end portion closer to the speed reduction mechanism may have a diameter smaller than the press-fitting portion.

Accordingly, when the pin is being press-fitted into the press-fitting hole in the intermediate wall, the press-fitting portion of the pin is press-fitted into the press-fitting hole in the intermediate wall after the end portion of the pin closer to the speed reduction mechanism is inserted in the press-fitting hole and the pin is correctly oriented such that an axial direction of the pin is aligned with a central axis direction of the press-fitting hole. The pin is, in this manner, prevented from falling when press-fitted into the press-fitting hole, so that positioning accuracy of the pin can be improved. As a result, coupled with the accurate centering of the ring gear achieved by the centering mechanism, tooth contact between the ring gear and the planetary pinion gear can be improved. Gear durability is therefore improved and gear noise is reduced in the speed reduction mechanism.

In the vehicle drive apparatus according to a sixth aspect of the present invention, the intermediate wall may include an oil hole that axially penetrates on an outer diameter side of the locking mechanism and is capable of circulating lubricating oil from the motor generator side to the speed reduction mechanism side, and a lubricating trough that guides the lubricating oil into the oil hole.

This makes it possible to reuse cooling oil that flows in from the coil of the motor generator, is received by the lubricating trough, and is caused to flow toward the pin via the oil hole, for lubrication of the pin. The cooling oil for the coil of the motor generator is reused for lubricating the pin in this manner eliminates likelihood that the pin wears out through friction with the ring gear flange.

In the vehicle drive apparatus according to a seventh aspect of the present invention, the locking mechanism may be disposed on an inner diameter side of a coil end of the motor generator, and the bearing may be disposed on an inner diameter side of the locking mechanism.

As such, the locking mechanism is disposed outside the bearing for the rotor shaft of the motor generator and on the inner diameter side of the coil end. There is therefore no need to newly provide a space to dispose the locking mechanism. Specifically, the locking mechanism can be disposed by using an empty space on the inner diameter side of the coil end of the motor generator. Consequently, fixing the ring gear to the case via the ring gear flange does not lead to an increased axial dimension of the drive apparatus.

In the vehicle drive apparatus according to an eighth aspect of the present invention, the locking mechanism may be disposed so as to overlap the coil end and the bearing in an axial direction.

This makes it possible to shorten the axial dimension of the drive apparatus. Specifically, reduction in size in the axial direction can be achieved.

In the vehicle drive apparatus according to a ninth aspect of the present invention, the locking mechanism may be disposed so as to overlap the centering mechanism and the bearing in an axial direction.

This makes it possible to prevent the axial dimension of the drive apparatus from increasing as a result of providing the locking mechanism and the centering mechanism. Especially when the locking mechanism is disposed outside the bearing for the rotor shaft of the motor generator and on the inner diameter side of the coil end, the axial dimension of the drive apparatus can be even further shortened. Specifically, the axial size can be even further reduced.

In the vehicle drive apparatus according to the present invention, the ring gear can be reliably centered by fixing the ring gear in the speed reduction mechanism as described above, so that the gear noise can be reliably reduced.

DETAILED DESCRIPTION OF THE EMBODIMENT

Figure 1:
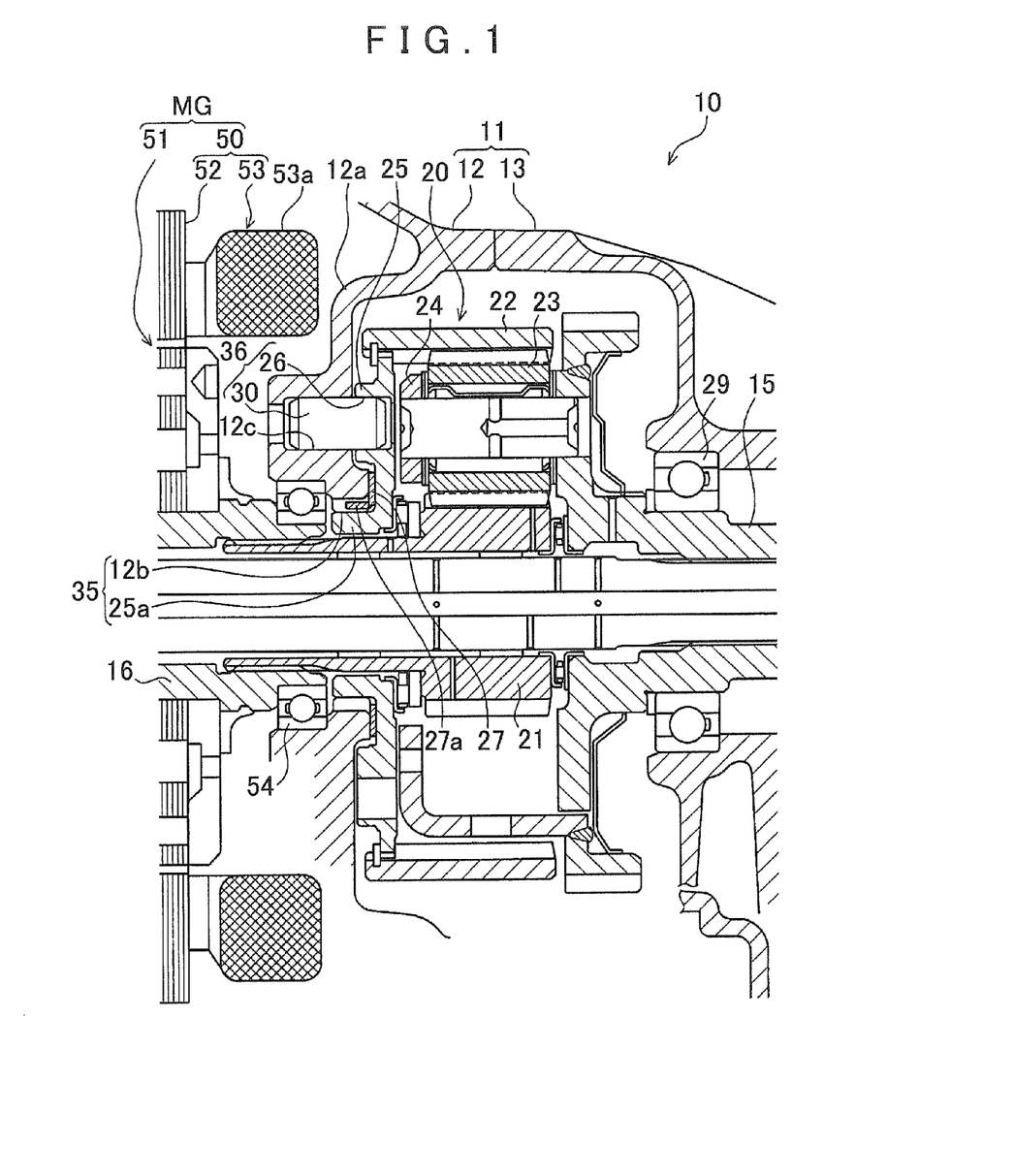
FIG. 1 is a cross-sectional view schematically showing a configuration around a speed reduction mechanism of a drive apparatus according to an embodiment of the present invention.

A vehicle drive apparatus according to a preferred embodiment of the present invention will be described in detail below with reference to the accompanying drawings. The embodiment represents a drive apparatus disposed longitudinally in a front-engine rear-drive (FR) hybrid vehicle. The drive apparatus according to the embodiment will be described with reference to FIG. 1. FIG. 1 is a cross-sectional view schematically showing a configuration of a speed reduction mechanism of the drive apparatus according to the embodiment.

Referring to FIG. 1, a drive apparatus 10 according to the embodiment includes a motor generator MG, a speed reduction mechanism 20 connected to the motor generator MG, and an output shaft 15 connected to the speed reduction mechanism 20. These are accommodated inside a transmission case 11 composed of a main housing 12 and an extension housing 13. The main housing 12 and the extension housing 13 each are formed of a metallic material, such as aluminum, and positioned and joined to each other via a dowel pin disposed on a joining surface. The drive apparatus 10 is configured to output rotation of the motor generator MG from the output shaft 15 by reducing a speed of the rotation through the speed reduction mechanism 20.

The motor generator MG has a function as an electric motor driven through supply of electric power (power running function) and a function as a generator converting mechanical energy to electric energy (power regenerative function). The motor generator MG operates mainly as the electric motor. An AC synchronous motor generator may, for example, be used for the motor generator MG. An electric storage device, such as a battery and a capacitor, or a well-known fuel cell, for example, may be used as an electric power supply device.

The motor generator MG, such as one described above, includes a stator 50 fixed to the main housing 12 and a rotatable rotor 51. The stator 50 includes a stator core 52 and a coil 53 wound around the stator core 52. Each of the rotor 51 and the stator core 52 is formed of a plurality of magnetic steel sheets, each of which is stacked on top of another in a thickness direction thereof (left-right direction in FIG. 1), and has a predetermined thickness. A rotor shaft 16 is disposed at the center of the rotor 51 and the rotor 51 is connected to the rotor shaft 16. This results in the rotor 51 and the rotor shaft 16 integrally rotating. The rotor shaft 16 is rotatably supported on a pair of bearings. Of the pair of bearings, a bearing 54 disposed closer to the speed reduction mechanism 20 is fixed to an intermediate wall 12a that forms part of the main housing 12 and separates the motor generator MG from the speed reduction mechanism 20.

The speed reduction mechanism 20 is disposed coaxially with the motor generator MG across the intermediate wall 12a. This results in the intermediate wall 12a isolating the motor generator MG from the speed reduction mechanism 20 inside the transmission case 11. The speed reduction mechanism 20 is composed of, what is called, a planetary gear unit of single pinion structure. Specifically, the speed reduction mechanism 20 includes a sun gear 21, a ring gear 22 disposed coaxially with the sun gear 21, and a planetary carrier 24 holding a planetary pinion gear 23 that meshes with the sun gear 21 and the ring gear 22. The planetary carrier 24 is joined to the output shaft 15 by welding and the output shaft 15 is rotatably supported by a bearing 29. The bearing 29 is fixed to the extension housing 13 so as to be restricted from moving in a thrust direction of the output shaft 15.

In the speed reduction mechanism 20, the ring gear 22 is fixed to the transmission case 11 (main housing 12). The rotor shaft 16 is in splined engagement with the sun gear 21. The planetary carrier 24 and the output shaft 15 are joined together by welding. This allows, in the speed reduction mechanism 20, a rotational speed of the rotor shaft 16 to be reduced and transmitted to the output shaft 15 by the planetary gear unit.

Figure 2:
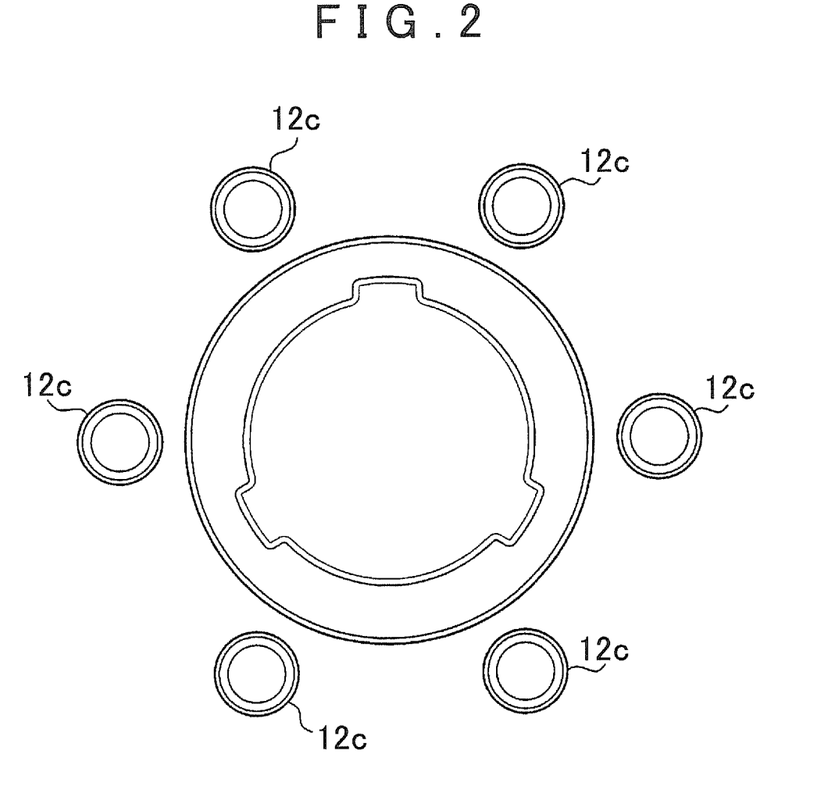
FIG. 2 is an illustration showing an arrangement of press-fitting holes formed in an intermediate wall.
Figure 3:
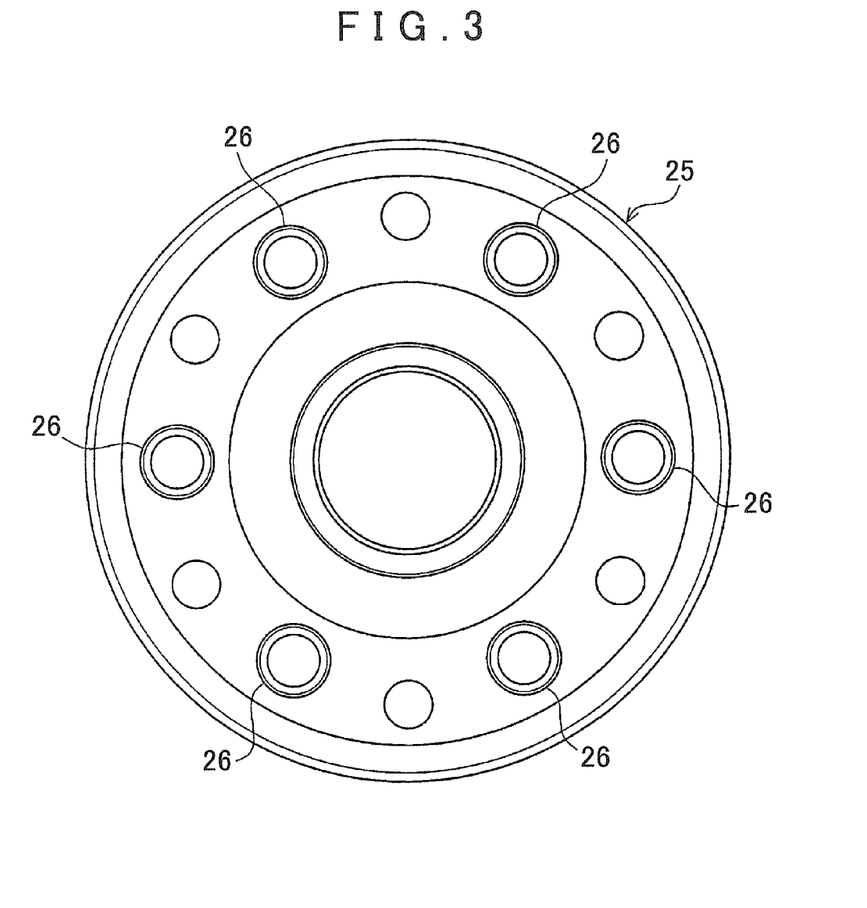
FIG. 3 is a plan view showing a ring gear flange as viewed from a motor generator side.

A fixing structure for the ring gear 22 will here be described with reference to FIGS. 2 and 3 in addition to FIG. 1. FIG. 2 is an illustration showing an arrangement of press-fitting holes formed in the intermediate wall. FIG. 3 is a plan view showing a ring gear flange as viewed from the motor generator side.

Referring to FIG. 1, the ring gear 22 is fixed to the intermediate wall 12a via a ring gear flange 25. Specifically, an outer periphery of a boss portion 25a of the ring gear flange 25 is fitted into a fitting hole 12b formed in the intermediate wall 12a (a socket-and-spigot fitting is employed in this embodiment, but the present invention is not limited to this). In addition, a pin 30 disposed on the intermediate wall 12a is inserted into a pin insertion hole 26 formed in the ring gear flange 25. The ring gear 22 is thereby fixed to the intermediate wall 12a. The outer periphery of the ring gear 22 does not therefore make any physical contact with the transmission case 11, so that vibration occurring from meshing gears in the speed reduction mechanism 20 or that occurring as a result of deformation of the ring gear 22 due to a compelling force is less likely to be transmitted to an outside of the transmission case 11. Vibration of the ring gear 22 caused by other factors is transmitted to the outside of the transmission case 11 through the intermediate wall 12a. These allow the gear noise emitted from the transmission case 11 to be reliably reduced in the drive apparatus 10.

The ring gear flange 25 and the intermediate wall 12a are in contact with each other via a washer 27. The washer 27 has a plurality of tab portions 27a that enter the intermediate wall 12a. In this embodiment, the washer 27 has three tab portions 27a. The tab portions 27a fix (lock) the washer 27 to the intermediate wall 12a. The washer 27 prevents the intermediate wall 12a from wearing.

The ring gear 22 can be centered by a centering mechanism 35 formed by the socket-and-spigot fitting of the boss portion 25a of the ring gear flange 25 and the fitting hole 12b in the intermediate wall 12a. As such, in this embodiment, the centering mechanism 35 for the ring gear 22 is formed by the boss portion 25a of the ring gear flange 25 and the fitting hole 12b in the intermediate wall 12a. Additionally, the outer periphery of the ring gear 22 is not fixed, so that the center of the ring gear 22 can be aligned through meshing between the ring gear 22 and the planetary pinion gear 23. According to the fixing structure for the ring gear of this embodiment, the ring gear 22 can be accurately centered.

A plurality of pins 30 and pin insertion holes 26 for fixing (locking) the ring gear 22 to the intermediate wall 12a are disposed concentrically and equally spaced apart from each other. The pins 30 are press-fitted into press-fitting holes 12c formed concentrically and equally spaced apart from each other in the intermediate wall 12a shown in FIG. 2. In this embodiment, six press-fitting holes 12c are formed in the intermediate wall 12a. The pin 30 is inserted into each of these press-fitting holes 12c. Referring to FIG. 3, the ring gear flange 25 has the pin insertion holes 26 into which the pins 30 press-fitted in the intermediate wall 12a are to be inserted. Note that the pin insertion hole 26 has a diameter slightly larger than that of the pin 30, which improves mountability of the speed reduction mechanism 20 onto the intermediate wall 12a. With the pins 30 being inserted in the pin insertion holes 26, the ring gear 22 is fixed (locked) to the intermediate wall 12a. Specifically, in this embodiment, a locking mechanism 36 is formed with an extremely simple structure of the pins 30 press-fitted into the intermediate wall 12a and the pin insertion holes 26 in the ring gear flange 25.

Referring to FIG. 1, the locking mechanism 36 formed with the pin 30 and the pin insertion hole 26 is disposed on the outer periphery side relative to the centering mechanism 35 formed with the boss portion 25a and the fitting hole 12b. This allows the locking mechanism 36 to be disposed on a relatively outer peripheral side of the ring gear flange 25. Load acting on the pin 30 can thereby be made small, so that the ring gear 22 can be solidly fixed in place even when relatively large torque is input to the speed reduction mechanism 20. As a result, tooth contact between the ring gear 22 and the planetary pinion gear 23 can be improved, coupled with the accurate centering of the ring gear 22 achieved by the centering mechanism 35. Gear durability in the speed reduction mechanism 20 is not therefore reduced.

The locking mechanism may be formed by disposing the pin on the ring gear flange 25 and having the pin insertion hole in the intermediate wall 12a. However, forming the locking mechanism 36 by disposing the pin 30 on the intermediate wall 12a and having the pin insertion hole 26 in the ring gear flange 25, as in this embodiment, allows the fitting hole 12b and the press-fitting hole 12c to be machined in the intermediate wall 12a simultaneously when the main housing 12 is machined. This improves machining accuracy of both, thus improving centering accuracy of the ring gear 22, which is advantageous to reduction of the gear noise.

Instead of using pin engagement for locking (fixing) of the ring gear 22, either the intermediate wall 12a or the ring gear flange 25 may be configured to have a screw hole and both may be fastened with a bolt. In such bolt fastening, however, loosening of the bolt may possibly occur, so that a large bolt fastening force needs to be produced. This requires the increased number of bolts used or a longer bolt length. This invites an increase in product cost and production cost. Moreover, acquisition of a space for disposing the bolts leads to an increased size of the drive apparatus. From the foregoing, the bolt fastening employed in locking (fixing) of the ring gear 22 is not practical.

Additionally, in the locking mechanism 36 of this embodiment, a dowel hole into which the dowel pin that positions the main housing 12 relative to the extension housing 13 is driven is machined at the same time that the fitting hole 12b and the press-fitting hole 12c are machined in the main housing 12. This allows the main housing 12 and the extension housing 13 to be accurately positioned relative to each other, so that positioning accuracy of the speed reduction mechanism 20 can be achieved. This is because the ring gear 22 is centered using the fitting hole 12b formed in the intermediate wall 12a of the main housing 12 and the bearing 29 that supports the planetary carrier 24 of the speed reduction mechanism 20 is fixed to the extension housing 13. Achieving the positioning accuracy of the speed reduction mechanism 20 as a whole as described above advantageously affects gear noise reduction and gear durability. Further, the fitting hole 12b, the press-fitting hole 12c, and the dowel hole are machined simultaneously and the pin 30 and the dowel pin are driven into these holes simultaneously, whereby productivity becomes high.

The locking mechanism 36 described above is disposed outside the bearing 54 that supports the rotor shaft 16 of the motor generator MG (specifically, the bearing 54 is disposed on the inner diameter side of the locking mechanism 36) and on the inner diameter side of a coil end 53a. This allows the locking mechanism 36 to be disposed by using an empty space on the inner diameter side of the coil end 53a of the motor generator MG. As a result, there is no need to newly provide a space for disposing the locking mechanism 36 that fixes the ring gear 22 to the transmission case 11 via the ring gear flange 25. Consequently, even if the fixing structure for the ring gear 22 according to the embodiment is employed, an axial dimension of the drive apparatus 10 does not increase.

Additionally, the locking mechanism 36 is disposed so as to overlap the coil end 53a, the bearing 54, and the centering mechanism 35 in the axial direction. This results in a shorter axial dimension of the drive apparatus 10, and specifically, reduction in size in the axial direction can be achieved.

In addition, in the locking mechanism 36, the press-fitting hole 12c into which the pin 30 is press-fitted and the pin insertion hole 26 into which the pin 30 is inserted are stepped. Specifically, each of the press-fitting hole 12c and the pin insertion hole 26 includes a large diameter hole portion in which the pin 30 is press-fitted or inserted and a small diameter hole portion having a diameter smaller than the large diameter hole portion. This prevents the pin 30 from coming off the press-fitting hole 12c and the pin insertion hole 26 even if the pin 30 press-fitted into the press-fitting hole 12c comes off the intermediate wall 12a. Consequently, the ring gear 22 can be reliably locked (fixed) by the pin 30 even if the pin 30 is removed from the intermediate wall 12a. Note that the press-fitting hole and the pin insertion hole may be a closed-bottom hole, instead of a stepped hole.

Next, operation of the above-described drive apparatus 10 will be briefly described. When the motor generator MG is driven as the electric motor, power (torque) of the motor generator MG is transmitted to the sun gear 21 via the rotor shaft 16. Then, since the ring gear 22 is fixed in the speed reduction mechanism 20, the planetary pinion gear 23 that meshes with the sun gear 21 rotates, while revolving around the sun gear 21. The rotation of the sun gear 21 is thereby transmitted to the planetary carrier 24 with its speed reduced, so that the output shaft 15 in mesh with the planetary carrier 24 is rotated. In this manner, in the drive apparatus 10, a speed of the rotation of the motor generator MG is reduced by the speed reduction mechanism 20, and the rotation at a reduced speed is transmitted to the output shaft 15.

During the rotation of the planetary pinion gear 23, a radially outward force acts on the ring gear 22 from the planetary pinion gear 23, and thus the ring gear 22 is deformed. In the drive apparatus 10 according to this embodiment, however, the outer periphery of the ring gear 22 is not in contact with the transmission case 11. This makes it less likely that vibration occurring from the deformed ring gear 22 will be transmitted to the transmission case 11. Vibration occurring from meshing between the planetary pinion gear 23 and the ring gear 22 is also less likely to be transmitted to the transmission case 11. Gear noise emitted from the transmission case 11 can thereby be reduced.

Since the ring gear 22 is highly accurately centered as described earlier, tooth contact between the planetary pinion gear 23 and the ring gear 22 is extremely good. This improves gear durability in the speed reduction mechanism 20 and reduces gear noise. Gear noise emitted from the transmission case 11 can therefore be reduced even further.

Figure 4:
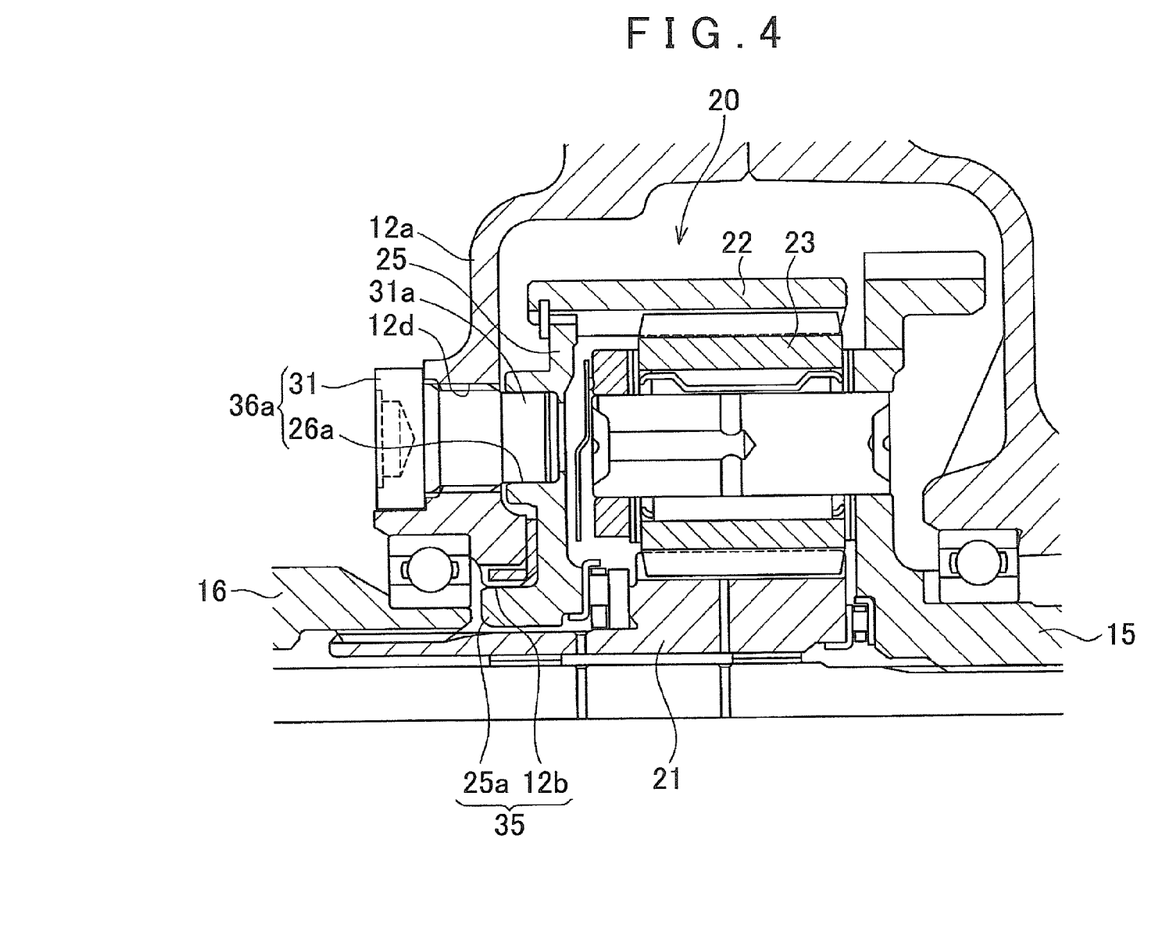
FIG. 4 is an illustration schematically showing a configuration of a locking mechanism according to a first modified example.
Figure 5:
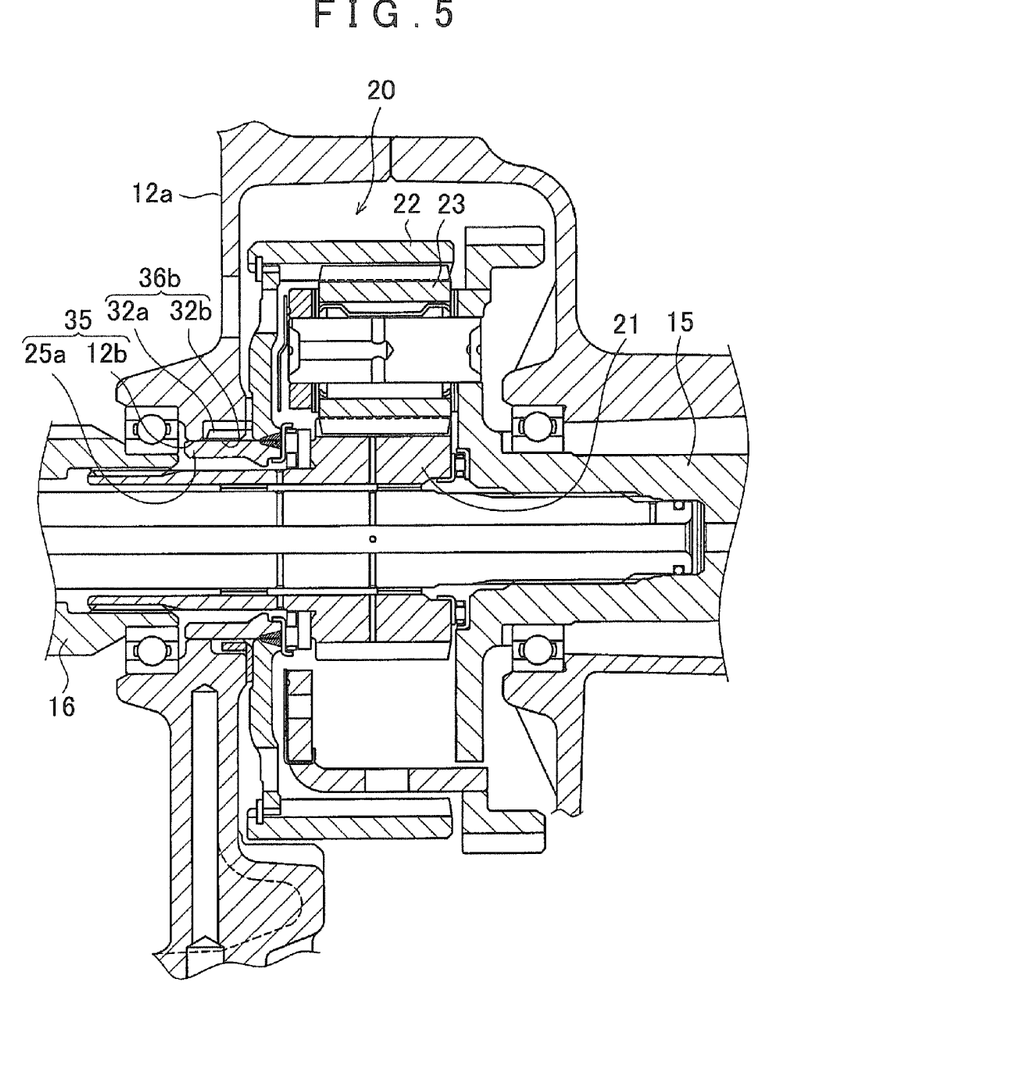
FIG. 5 is an illustration schematically showing a configuration of a locking mechanism according to a second modified example.
Figure 6:
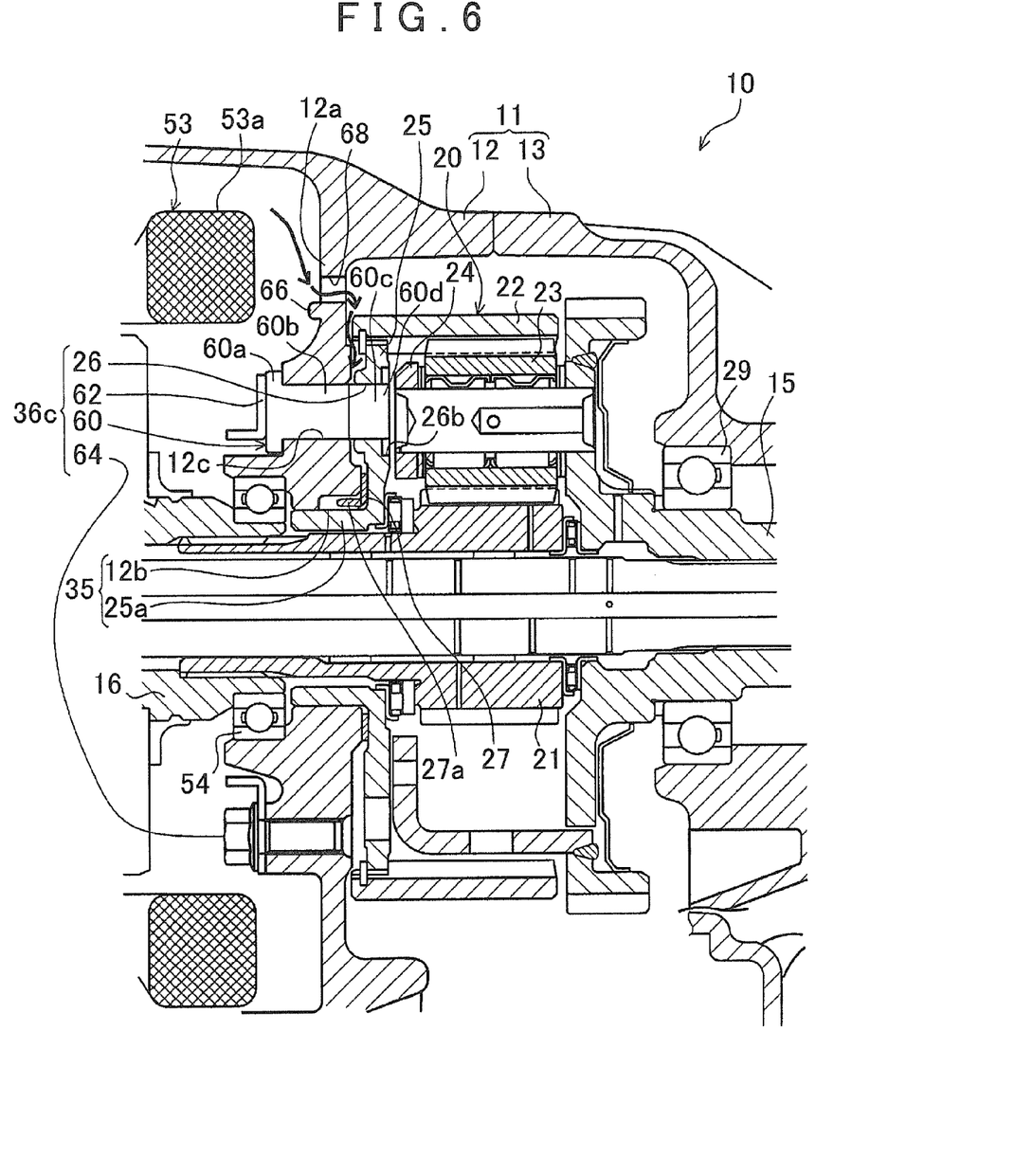
FIG. 6 is an illustration schematically showing a configuration of a locking mechanism according to a third modified example.
Figure 7:
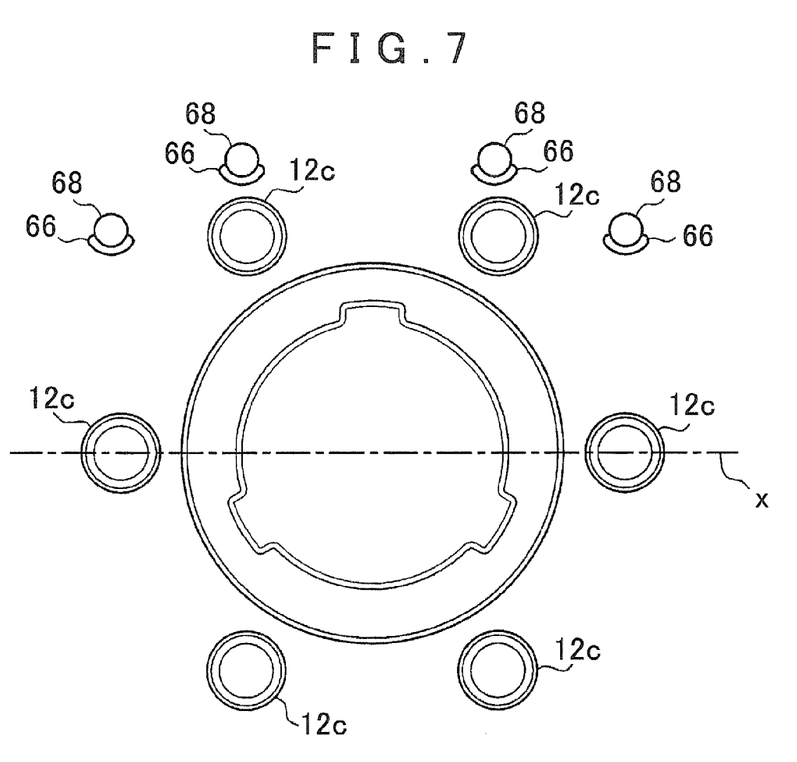
FIG. 7 is an illustration showing an arrangement of press-fitting holes, lubricating troughs, and oil holes formed in an intermediate wall.

Modified examples of the locking mechanism will be described below with reference to FIGS. 4 to 7. FIG. 4 is an illustration schematically showing a configuration according to a first modified example. FIG. 5 is an illustration schematically showing a configuration according to a second modified example. FIG. 6 is an illustration schematically showing a configuration according to a third modified example. FIG. 7 is an illustration showing an arrangement of press-fitting holes, lubricating troughs, and oil holes formed in an intermediate wall in the third modified example. The first modified example represents a case in which the ring gear 22 is fixed using an anchor bolt. The second modified example represents a case in which the ring gear 22 is fixed through spline engagement. The third modified example represents a case in which the ring gear 22 is fixed using a pin having a flange portion.

The first modified example will be described. Referring to FIG. 4, in the first modified example, an anchor bolt 31 is employed in a locking mechanism 36a, in place of the pin 30. The anchor bolt 31 is fastened by being threadedly engaged in a threaded hole 12d formed in place of the press-fitting hole 12c in the intermediate wall 12a. The anchor bolt 31 has a leading end portion 31a protruding from the intermediate wall 12a. The leading end portion 31a is inserted in an insertion hole 26a formed in place of the pin insertion hole 26 in the ring gear flange 25. This results in the ring gear 22 being fixed to the intermediate wall 12a via the ring gear flange 25. Specifically, in the first modified example, the locking mechanism 36a is formed by the anchor bolt 31 and the insertion hole 26a.

The locking mechanism 36a, which uses the anchor bolt 31 as described above, enhances reliability against removal from (including backlash) the intermediate wall 12a as compared with the pin 30. As a result, the ring gear 22 can be fixed in place in a solidly positioned state for a long period of time. This eliminates likelihood for a long period of time that the tooth contact between the ring gear 22 and the planetary pinion gear 23 will be aggravated, so that gear durability is improved and gear noise is reduced in the speed reduction mechanism 20.

The second modified example will be described. Referring to FIG. 5, in the second modified example, a locking mechanism 36b employs spline engagement instead of engagement between the pin 30 and the pin insertion hole 26. Specifically, a male spline 32a formed on an outer periphery of the boss portion 25a of the ring gear flange 25 and a female spline 32b formed on an inner periphery of the fitting hole 12b in the intermediate wall 12a are in splined engagement with each other. The splined engagement between the male spline 32a and the female spline 32b fixes the ring gear 22 to the intermediate wall 12a via the ring gear flange 25. Specifically, in the second modified example, the locking mechanism 36b is formed by the male spline 32a and the female spline 32b.

Use of the splined engagement between the male spline 32a and the female spline 32b for the locking mechanism 36b as described above eliminates a step of fixing the plurality of pins 30 or the anchor bolt 31 in the intermediate wall 12a. This simplifies assembly of the drive apparatus 10, thus contributing to improved productivity of the drive apparatus 10 and reduced product cost.

The third modified example will be described. Referring to FIG. 6, in the third modified example, a locking mechanism 36c uses a pin 60 having a flange portion 60a in place of the pin 30. The pin 60 includes the flange portion 60a, a press-fitting portion 60b, and a leading end portion 60c, disposed in this order from the motor generator MG side. Note that the leading end portion 60c is an example of the "end portion closer to the speed reduction mechanism" in the present invention. The flange portion 60a has a diameter larger than that of the press-fitting portion 60b. Specifically, the flange portion 60a has a diameter larger than that of the press-fitting hole 12c in the intermediate wall 12a and the leading end portion 60c has a diameter smaller than the press-fitting portion 60b. The pin 60 is fixed in the intermediate wall 12a by being press-fitted into the press-fitting hole 12c. Additionally, the pin 60 has the leading end portion 60c protruding from the intermediate wall 12a and inserted in the pin insertion hole 26 in the ring gear flange 25. In addition, a retaining annular plate 62 is disposed on a side of the pin 60 closer to the motor generator MG. The plate 62 is fixed to the intermediate wall 12a with a bolt 64.

The pin insertion hole 26 is configured to have a diameter only slightly larger than that of the leading end portion 60c of the pin 60, to thereby improve mountability of the speed reduction mechanism 20 onto the intermediate wall 12a. The leading end portion 60c of the pin 60 is inserted into the pin insertion hole 26, which fixes the ring gear 22 to the intermediate wall 12a via the ring gear flange 25. Specifically, in the third modified example, the locking mechanism 36c is formed by the pin 60, the pin insertion hole 26, the plate 62, and the bolt 64.

The pin 60 has the flange portion 60a disposed closer to the motor generator MG relative to the intermediate wall 12a as described above. This prevents the pin 60 from coming off the intermediate wall 12a to the speed reduction mechanism 20 side, which is more likely to happen. Use of the pin 60 in the locking mechanism 36c therefore can enhance reliability against removal from the intermediate wall 12a as compared with the pin 30. Note that the retaining annular plate 62 disposed on the side of the pin 60 closer to the motor generator MG prevents the pin 60 from being removed to the motor generator MG side even if the pin 60 comes off the intermediate wall 12a.

When the pin 60 is to be press-fitted into the press-fitting hole 12c in the intermediate wall 12a, pushing the flange portion 60a allows the pin 60 to be stably press-fitted into the press-fitting hole 12c in the intermediate wall 12a. Additionally, since the pin 60 has the flange portion 60a, the pin 60 provides a unique orientation. Moreover, productivity is improved, because machining accuracy can be more easily achieved in drilling the press-fitting hole 12c than in threading a bolt hole, such as the hole 12d of the first modified example.

In addition, for the pin 60, the leading end portion 60c to be inserted and fitted in the pin insertion hole 26 in the ring gear flange 25 is configured to have a diameter smaller than the press-fitting portion 60b to be press-fitted into the press-fitting hole 12c in the intermediate wall 12a. When the pin 60 is to be press-fitted into the press-fitting hole 12c in the intermediate wall 12a, this allows the press-fitting portion 60b of the pin 60 to be press-fitted into the press-fitting hole 12c in the intermediate wall 12a after the leading end portion 60c of the pin 60 is inserted in the press-fitting hole 12c and the pin 60 is correctly oriented such that an axial direction of the pin 60 is aligned with a central axis direction of the press-fitting hole 12c. The pin 60 is, in this manner, prevented from falling when press-fitted into the press-fitting hole 12c, so that positioning accuracy of the pin 60 can be improved. The improved positioning accuracy of the pin 60 allows the ring gear 22 to be fixed in a predetermined position. As a result, coupled with the accurate centering of the ring gear 22 achieved by the centering mechanism 35, tooth contact between the ring gear 22 and the planetary pinion gear 23 can be improved. Gear durability is therefore improved and gear noise is reduced in the speed reduction mechanism 20.

Referring to FIG. 6, the intermediate wall 12a has a lubricating trough 66 and an oil hole 68 disposed on an outer diameter side of the locking mechanism 36c. The oil hole 68 penetrates through the intermediate wall 12a in the axial direction. This achieves the following effects. Specifically, as shown by arrows in FIG. 6, the lubricating trough 66 receives cooling oil that flows in from the coil 53 of the motor generator MG to thereby guide the cooling oil into the oil hole 68. The cooling oil is thus made to circulate toward the speed reduction mechanism 20 side via the oil hole 68, flowing onto the pin 60, so that the cooling oil can be reused as lubricating oil for the pin 60. The cooling oil for the coil 53 of the motor generator MG reused for lubricating the pin 60 in this manner eliminates likelihood that the pin 60 will wear out through friction with the ring gear flange 25.

Referring to FIG. 7, four lubricating troughs 66 and corresponding oil holes 68 are disposed at positions at least upward (upper side in FIG. 7) of a central axis X of the intermediate wall 12a when the drive apparatus 10 is mounted on the vehicle. Two lubricating troughs 66 and corresponding oil holes 68 are disposed at positions upward of the two uppermost press-fitting holes 12c (uppermost side in FIG. 7) of the six press-fitting holes 12c. The number of lubricating troughs 66 and oil holes 68 is not particularly limited and may be changed as appropriately. By disposing the lubricating troughs 66 and the oil holes 68 in this manner, the cooling oil that flows out from the oil holes 68 properly flows onto all of the six pins 60 press-fitted in the six press-fitting holes 12c. Note that FIG. 7 is an illustration showing an arrangement of the press-fitting holes 12c, the lubricating troughs 66, and the oil holes 68 formed in the intermediate wall 12a. The lubricating troughs 66 and the oil holes 68, such as those arranged as described above, may also be appropriately employed in the embodiment shown in FIG. 1 and the first modified example.

Referring to FIG. 6, the pin insertion hole 26 in the ring gear flange 25 has a large diameter hole portion 26b disposed closer to the planetary carrier 24. The large diameter hole portion 26b is a portion from which a distal leading end portion 60d of the leading end portion 60c of the pin 60 protrudes when the pin 60 is press-fitted and fixed in the press-fitting hole 12c in the intermediate wall 12a. With this configuration, the pin insertion hole 26 and the pin 60 are in surface contact and scraped against each other when torque is input to the speed reduction mechanism 20, so that ridge wear can be prevented from developing in the pin insertion hole 26.

As compared with the embodiment shown in FIG. 1, the boss portion 25a of the ring gear flange 25 has a long axial length. This makes it possible to inhibit the ring gear flange 25 from tilting, leading to even further improved centering accuracy of the ring gear 22.

As described in detail heretofore, in the drive apparatus 10 according to the embodiment, the ring gear 22 is fixed to the intermediate wall 12a via the ring gear flange 25 positioned relative to, and fixed to, the intermediate wall 12a by the centering mechanism 35 and the locking mechanism 36. This eliminates any physical contact between the outer periphery of the ring gear 22 and the transmission case 11, so that vibration occurring from meshing gears or that occurring as a result of deformation of the ring gear 22 due to a compelling force is less likely to be transmitted to an outer periphery of the transmission case 11. Vibration of the ring gear 22 caused by other factors is transmitted to the outer periphery of the transmission case 11 through the intermediate wall 12a. Accordingly, the gear noise emitted from the transmission case 11 can be reliably reduced.

In the drive apparatus 10, the ring gear 22 can be centered by the centering mechanism 35 formed by the socket-and-spigot fitting of the boss portion 25a of the ring gear flange 25 and the intermediate wall 12a. Additionally, the ring gear 22 is fixed via the ring gear flange 25, so that alignment can be achieved through meshing between the ring gear 22 and the planetary pinion gear 23. From the foregoing, the ring gear 22 can be centered accurately.

In addition, in the drive apparatus 10, the locking mechanism 36 is disposed on the outer periphery side relative to the centering mechanism 35. This allows the locking mechanism 36 to be disposed on a relatively outer peripheral side of the ring gear flange 25. Load acting on the locking mechanism 36 (mainly the pin 30) can thereby be made small, so that the ring gear 22 can be solidly fixed in place. Together with the accurate centering of the ring gear 22, the foregoing improves tooth contact between the ring gear 22 and the planetary pinion gear 23. Gear noise can thereby be made small without reducing gear durability. Gear noise emitted from the transmission case 11 can therefore be reduced even further.

The above-described embodiment is only illustrative and is not intended to limit the present invention. It is understood that changes and modifications may be made without departing from the scope of the present invention. For example, in the above-described embodiment, a portion protruding from the intermediate wall 12a is disposed using the pin 30 or the anchor bolt 31. However, the protruding portion may be integrally formed in the main housing 12 during molding of the main housing 12. Understandably, such an integrally formed protruding portion may be formed in the ring gear flange 25, in place of the main housing 12.

The above-described embodiment exemplifies the present invention as applied to a drive apparatus disposed longitudinally in a front-engine rear-drive (FR) vehicle. The present invention may nonetheless be applied to a drive apparatus disposed laterally in a front-engine front-drive (FF) vehicle.

The invention claimed is:

1. A vehicle drive apparatus, comprising:
    a motor generator;
    a speed reduction mechanism connected to a rotor shaft of the motor generator;
    an output shaft connected to the speed reduction mechanism;
    an intermediate wall separating the motor generator from the speed reduction mechanism; and
    a bearing that is fixed to the intermediate wall and supports the rotor shaft, wherein
    the motor generator, the intermediate wall, the speed reduction mechanism, and the output shaft are disposed in this order, and a ring gear of the speed reduction mechanism is fixed,
    the ring gear is fixed to the intermediate wall via a ring gear flange that is positioned relative to, and fixed to, the intermediate wall by a centering mechanism and a locking mechanism,
    the centering mechanism is formed by fitting of a boss portion of the ring gear flange and the intermediate wall, and
    the locking mechanism is disposed on an outer peripheral side relative to the centering mechanism.

2. The vehicle drive apparatus according to claim 1, wherein
    the locking mechanism includes a protruding portion disposed on the intermediate wall or the ring gear flange and an insertion hole formed in the ring gear flange or the intermediate wall, into which the protruding portion is inserted.

3. The vehicle drive apparatus according to claim 2, wherein
    the protruding portion is a pin fixed in the intermediate wall, and
    the insertion hole has a small diameter portion having a diameter smaller than a portion in which the pin is inserted, or a bottom portion.

4. The vehicle drive apparatus according to claim 2, wherein
    the protruding portion is a pin fixed in the intermediate wall, and
    the pin is press-fitted in a press-fitting hole in the intermediate wall and has a flange portion that is disposed on an end portion of the pin closer to the motor generator and has a diameter larger than the press-fitting hole.

5. The vehicle drive apparatus according to claim 4, wherein
    the pin includes a press-fitting portion to be press-fitted in the press-fitting hole and an end portion disposed closer to the speed reduction mechanism than the press-fitting portion, and
    the end portion closer to the speed reduction mechanism has a diameter smaller than the press-fitting portion.

6. The vehicle drive apparatus according to claim 5, wherein
    the intermediate wall includes an oil hole that axially penetrates on an outer diameter side of the locking mechanism and is capable of circulating lubricating oil from the motor generator side to the speed reduction mechanism side, and a lubricating trough that guides the lubricating oil into the oil hole.

7. The vehicle drive apparatus according to claim 6, wherein
    the locking mechanism is disposed on an inner diameter side of a coil end of the motor generator, and
    the bearing is disposed on an inner diameter side of the locking mechanism.

8. The vehicle drive apparatus according to claim 7, wherein
    the locking mechanism is disposed so as to overlap the coil end and the bearing in an axial direction.

9. The vehicle drive apparatus according to claim 8, wherein
    the locking mechanism is disposed so as to overlap the centering mechanism and the bearing in an axial direction.

10. The vehicle drive apparatus according to claim 2, wherein
    the intermediate wall includes an oil hole that axially penetrates on an outer diameter side of the locking mechanism and is capable of circulating lubricating oil from the motor generator side to the speed reduction mechanism side, and a lubricating trough that guides the lubricating oil into the oil hole.

11. The vehicle drive apparatus according to claim 10, wherein
    the locking mechanism is disposed on an inner diameter side of a coil end of the motor generator, and
    the bearing is disposed on an inner diameter side of the locking mechanism.

12. The vehicle drive apparatus according to claim 11, wherein
    the locking mechanism is disposed so as to overlap the centering mechanism and the bearing in an axial direction.

13. The vehicle drive apparatus according to claim 1, wherein
    the intermediate wall includes an oil hole that axially penetrates on an outer diameter side of the locking mechanism and is capable of circulating lubricating oil from the motor generator side to the speed reduction mechanism side, and a lubricating trough that guides the lubricating oil into the oil hole.

14. The vehicle drive apparatus according to claim 13, wherein
the locking mechanism is disposed on an inner diameter side of a coil end of the motor generator, and
the bearing is disposed on an inner diameter side of the locking mechanism.

15. The vehicle drive apparatus according to claim 14, wherein
the locking mechanism is disposed so as to overlap the coil end and the bearing in an axial direction.

16. The vehicle drive apparatus according to claim 15, wherein
the locking mechanism is disposed so as to overlap the centering mechanism and the bearing in an axial direction.

17. The vehicle drive apparatus according to claim 1, wherein
the locking mechanism is disposed on an inner diameter side of a coil end of the motor generator, and
the bearing is disposed on an inner diameter side of the locking mechanism.

18. The vehicle drive apparatus according to claim 17, wherein
the locking mechanism is disposed so as to overlap the coil end and the bearing in an axial direction.

19. The vehicle drive apparatus according to claim 18, wherein
the locking mechanism is disposed so as to overlap the centering mechanism and the bearing in an axial direction.

20. The vehicle drive apparatus according to claim 1, wherein
the locking mechanism is disposed so as to overlap the centering mechanism and the bearing in an axial direction.

* * * * *